(12) United States Patent
Karunaratne et al.

(10) Patent No.: US 11,574,209 B2
(45) Date of Patent: Feb. 7, 2023

(54) DEVICE FOR HYPER-DIMENSIONAL COMPUTING TASKS

(71) Applicants: International Business Machines Corporation, Armonk, NY (US); ETH Zurich, Zurich (CH)

(72) Inventors: Kumudu Geethan Karunaratne, Gattikon (CH); Manuel Le Gallo-Bourdeau, Zurich (CH); Giovanni Cherubini, Rueschlikon (CH); Abu Sebastian, Adliswil (CH); Abbas Rahimi, Duebendorf (CH); Luca Benini, Zurich (CH)

(73) Assignees: International Business Machines Corporation, Armonk, NY (US); ETH ZURICH (EIDGENOESSISCHE TECHNISCHE HOCHSCHULE ZURICH), Zurich (CH)

( * ) Notice: Subject to any disclaimer, the term of this patent is extended or adjusted under 35 U.S.C. 154(b) by 813 days.

(21) Appl. No.: 16/426,572

(22) Filed: May 30, 2019

(65) Prior Publication Data

US 2020/0380384 A1 Dec. 3, 2020

(51) Int. Cl.
*G06F 17/00* (2019.01)
*G06N 5/04* (2006.01)
(Continued)

(52) U.S. Cl.
CPC .......... *G06N 5/04* (2013.01); *G06F 9/4806* (2013.01); *G06F 17/16* (2013.01); *G06N 20/10* (2019.01)

(58) Field of Classification Search
CPC ...................................................... G06N 5/04
(Continued)

(56) References Cited

U.S. PATENT DOCUMENTS 7,489,583 B2 * 2/2009 Kuekes ............... G11C 8/10
365/230.09
9,152,827 B2 10/2015 Linderman et al.
(Continued)

FOREIGN PATENT DOCUMENTS

EP 3261091 A1 12/2017
WO 2016122525 8/2016

OTHER PUBLICATIONS

Li, et al., A Memristor Crossbar-Based Computation Scheme With High Precision, arXiv preprint arXiv: 1611.03264, Nov. 19, 2016, 6 pages URL: https://arxiv.org/pdf/1611.03264.pdf.
(Continued)

*Primary Examiner* — Timothy A Mudrick
(74) *Attorney, Agent, or Firm* — Daniel Morris; Otterstedt & Kammer PLLC

(57) ABSTRACT

A system for hyper-dimensional computing for inference tasks may be provided. The device comprises an item memory for storing hyper-dimensional item vectors, a query transformation unit connected to the item memory, the query transformation unit being adapted for forming a hyper-dimensional query vector from a query input and hyper-dimensional base vectors stored in the item memory, and an associative memory adapted for storing a plurality of hyper-dimensional profile vectors and for determining a distance between the hyper-dimensional query vector and the plurality of hyper-dimensional profile vectors, wherein the item memory and the associative memory are adapted for in-memory computing using memristive devices.

25 Claims, 7 Drawing Sheets

(51) Int. Cl.
 *G06F 17/16* (2006.01)
 *G06F 9/48* (2006.01)
 *G06N 20/10* (2019.01)

(58) Field of Classification Search
 USPC .......................................................... 706/45
 See application file for complete search history.

(56) References Cited

U.S. PATENT DOCUMENTS

| | | | |
|---|---|---|---|
| 9,319,047 | B2 | 4/2016 | Jha et al. |
| 9,373,786 | B1 | 6/2016 | Kamalanathan |
| 10,572,795 | B1 * | 2/2020 | Dockendorf ............. G06N 3/08 |
| 10,949,214 | B2 * | 3/2021 | Khan .................... G06F 9/3895 |
| 2008/0089110 | A1 | 4/2008 | Robinett |
| 2012/0275211 | A1 | 11/2012 | Yi |
| 2014/0172937 | A1 | 6/2014 | Linderman |
| 2015/0170025 | A1 | 6/2015 | Wu et al. |
| 2017/0178725 | A1 | 6/2017 | Yang |
| 2018/0005110 | A1 | 1/2018 | Gokmen et al. |
| 2018/0046598 | A1 | 2/2018 | Le Gallo |
| 2018/0075339 | A1 | 3/2018 | Ma et al. |
| 2018/0108403 | A1 | 4/2018 | Ge |
| 2019/0066780 | A1 | 2/2019 | Hu et al. |
| 2019/0122727 | A1 | 4/2019 | Le Gallo-Bourdeau et al. |
| 2019/0189174 | A1 | 6/2019 | Hu |
| 2020/0117700 | A1 | 4/2020 | Chatterjee |
| 2020/0279012 | A1 | 9/2020 | Khaddam-Aljameh et al. |
| 2020/0379673 | A1 | 12/2020 | Le Gallo-Bourdeau |
| 2020/0381048 | A1 | 12/2020 | Le Gallo-Bourdeau |

OTHER PUBLICATIONS

Hu, et al., Dot-Product Engine for Neuromorphic Computing: Programming 1T1M Crossbar to Accelerate Matrix-Vector Multiplication, Proceedings of the 53rd annual design automation conference. ACM, Mar. 3, 2016, 7 pages URL: https://www.labs.hpe.com/techreports/2016/HPE-2016-23.pdf.

Sharad, et al., Ultra Low Power Associative Computing With Spin Neurons and Resistive Crossbar Memory, Proceedings of the 50th Annual Design Automation Conference. ACM, 2013, 6 pages URL: https://arxiv.org/ftp/arxiv/papers/1304/1304.2281.pdf.

Li, et al., Hyperdimensional Computing With 3D VRRAM in-Memory Kernels: Device-Architecture Co-Design for Energy-Efficient, Error-Resilient Language Recognition, 2016 IEEE International Electron Devices Meeting (IEDM). IEEE, 2016, pp. 16.1.1-16.1.4.

Li, et al., Device-Architecture Co-Design for Huperdimensional Computing With 3D Vertical Resistive Switching Random Access Memory (3D VRRAM), 2017 International Symposium on VLSI Technology, Systems and Application (VLSI-TSA), IEEE, 2017, 2 pages.

Rahimi, et al., High-Dimensional Computing as a Nanoscalable Paradigm, IEEE Transactions on Circuits and Systems-I: Regular Papers, vol. 64, No. 9, Sep. 2017, pp. 2508-2521.

Wu et al., Brain-Inspired Computing Exploiting Carbon Nanotube FETS and Resistive RAM Hyperdimensional Computing Case Study, ISSCC 2018/Session 31/Computation in Memory for Machine Learning/31.3, pp. 491-493.

Montagna et al., "PULP-HD: Accelerating Brain-Inspired High-Dimensional Computing on a Parallel Ultra-Low Power Platform", Proceedings of the 55th Annual Design Automation Conference, DAC '18, 2018.

Paul J. Otterstedt, Feb. 23, 2021, pp. 1-2, List of IBM Patents or Patent Applications Treated as Related.

Geethan Karunaratne, Manuel Le Gallo, Giovanni Cherubini, Luca Benini, Abbas Rahimi, Abu Sebastian, In-memory hyperdimensional computing, arXiv:1906.01548 [cs.ET] Apr. 9, 2020.

Rahimi A, Datta S, Kleyko D, Frady EP, Olshausen B, Kanerva P, Rabaey JM. High-dimensional computing as a nanoscalable paradigm IEEE Transactions on Circuits and Systems I: Regular Papers. Jun. 7, 2017;64(9):2508-21.

\* cited by examiner 700 method 702 storing hyper-dimensional item vectors in an item memory 704 forming a hyper-dimensional query vector from a query input and hyper-dimensional base vectors stored in the item memory 706 activating selectively word-lines of hyper-dimensional vectors in the crossbar array

DEVICE FOR HYPER-DIMENSIONAL COMPUTING TASKS

BACKGROUND

The invention relates generally to a system for hyper-dimensional computing tasks, and more specifically, to a system for hyper-dimensional computing for inference tasks. The invention relates further to a method for hyper-dimensional computing for inference tasks.

Classical computer systems based on the well-known von-Neumann architecture approach more and more the physical limits due to a high energy consumption required to move data from memory systems to one or more processing units and back to memory systems. The hunger, however, for more computer power does not vanish.

When designing biological computing systems, nature decided to trade accuracy for efficiency. Hence, one viable solution for continuous reduction in energy-per-operation is to rethink functionality to cope with uncertainty by adopting computational approaches that are inherently robust to uncertainty. Hyper-dimensional computing (HDC) is recognized as one such framework based on the observation that key aspects of human memory, perception, and cognition may be explained by the mathematical properties of hyper-dimensional spaces, and that a powerful system of computing can be built by relying on the rich algebra of hypervectors (i.e., hyper-dimensional or HD vectors).

Groups, rings, and fields over HD (hyper-dimensional) vectors become the underlying computing structures, with permutations, mappings and inverses as primitive computing operations, and randomness as an instrument to label new objects and entities. HD vectors may have a defined dimension d, wherein d>1000, and may be regarded as (pseudo-) random vectors with independent and identically distributed (i.i.d.) components. When the dimensionality is in the thousands, there exists a huge number of quasi-orthogonal HD vectors. This allows HDC to combine such HD vectors into new HD vectors using well-defined vector space operations, defined such that the resulting HD vector is unique, and with the same dimension, i.e., fixed-width. Operators are defined to not only classify, but also to bind, bundle, associate, and perform other types of cognitive operations in a straightforward manner.

In contrast to other brain-inspired approaches, such as deep learning in which learning is computationally much more demanding than subsequent classifications, learning in HDC is fast and computationally balanced with respect to classification by reusing the same operators again and again. The training algorithms in HDC allow learning to be achieved in one or few shots (i.e. cycles), which means that object categories are learned from one or few examples in a single parse over training data as opposed to many iterations. HDC may also produce transparent representations due to its well-defined set of arithmetic operations with distributivity and inversibility. It requires far fewer operations to achieve the same functionality than other approaches such as support vector machines, K-nearest neighbors algorithms, multilayer perceptrons, and convolutional neural networks.

HDC is intrinsically robust to failures, defects, variations, and noise of computing fabrics on which it may be implemented. Symbols are represented by HD vectors with binary i.i.d. components, and are combined by nearly i.i.d.—preserving operations. This may imply that failure in a component of an HD vector is not "contagious". At the same time, failures in a subset of components may be compensated for by the holographic nature of the data representation, i.e., the error-free components can still provide a useful representation that is similar enough to the original HD vector.

The manipulation of large patterns stored in memory and the inherent robustness may make HDC particularly well-suited for emerging computing paradigms such as in-memory computing or computational memory based on emerging nanoscale resistive memory devices. In one such work, 3D vertical resistive random access memory (ReRAM) devices have been used to perform individual operations for HDC. In another work, a carbon nanotube field effect transistor-based logic layer has been integrated to ReRAMs, improving efficiency further. However these prototypes have been limited in multiple aspects: a small 32-bit data path that demands heavy time-multiplexing of HD vectors; they can store only a fraction of HD models due to the limited availability of only 256 ReRAM cells; and they do not allow any reprogrammability as they are restricted to one application or binary classification task.

As examples of prior art documents, the following may be mentioned:

Document U.S. Pat. No. 9,152,827 B2 discloses an apparatus that performs a mathematical matrix-vector multiplication approximation using crossbar arrays of resistive memory devices. In that apparatus the crossbar array is formed by resistive memory devices serving as a memory array that stores the coefficients of a matrix. Combined with input and output analog circuits, the crossbar array realizes the method of performing matrix-vector multiplication approximation operations with significant performance, area and energy advantages over existing methods and designs.

Document US 2015/0170025 A1 discloses a method and an apparatus for performing close-loop programming of resistive memory devices in a crossbar array based hardware circuits and systems. The method also provides iterative training of memristor crossbar arrays for neural networks by applying voltages corresponding to the selected training patterns. Errors are detected and measured as a function of the actual response to the training patterns versus the expected response of the training pattern.

Hence, there is a need for an improved computing model and a related architecture and a related implementation for hyper-dimensional computing with a dimensionality above and/or far above the current limitations of the existing approaches.

SUMMARY

According to one aspect of the present invention, a system for hyper-dimensional computing for inference tasks may be provided. The device may comprise an item memory (IM) for storing hyper-dimensional item vectors and a query transformation unit connected to the item memory. The query transformation unit may be adapted for forming a hyper-dimensional query vector from a query input and hyper-dimensional base vectors stored in the item memory.

The device may also comprise an associative memory (AM) adapted for storing a plurality of hyper-dimensional profile vectors and for determining a distance between the hyper-dimensional query vector and the plurality of hyper-dimensional profile vectors. Thereby, the item memory and the associative memory may be adapted for in-memory computing using memristive devices.

According to another aspect of the present invention, a method for hyper-dimensional computing for inference tasks may be provided. The method may comprise storing hyper-dimensional item vectors in an item memory, forming a hyper-dimensional query vector from a query input and hyper-dimensional base vectors stored in the item memory, and determining a distance between the hyper-dimensional query vector and a plurality of hyper-dimensional profile vectors, such that in-memory computing, using memristive devices, is performed during the storing, forming and determining.

The proposed system for hyper-dimensional computing for inference tasks may offer multiple advantages and technical effects:

The proposed concept is enabled to overcome the so-far known limitations of a practical implementation of a real in-memory hyper-dimensional computing architecture with high dimensionality.

The training effort cycles as well as the inference tasks may be performed in very limited amounts of time because a training in the classical sense for a machine-learning model demanding a large amount of samples (assuming supervised learning) is not required here. Building profile hyper-dimensional vectors, as well as building hyper-dimensional query vectors can be executed in one or a very low number of machine cycles.

In addition to this advantage, it is also not required to move any data from a memory system to one or more processing units for processing and then store the resulting data again in a memory system. Instead, the required computations—like, e.g., encoding and binding—may be performed directly in memory devices which may be implemented as memristive devices. Thus, a true in-memory computing concept may be realized. The same applies to a distance calculation between HD profile vectors and HD query vectors because this activity may also be performed in a memory unit, and more particularly, in a crossbar of memristive devices used as associative memory.

Because the memristive devices may be implemented as 2D-planar devices together with other logic gates (AND, OR, XOR, XNOR, threshold units and the like) well-known manufacturing processes may be used to build devices according to the here proposed non-von-Neumann computing architecture.

The devices may be very energy efficient because the data movement is limited to a bare minimum. On the other side, classification tasks (i.e., inference tasks) may be implemented in a wide variety of different technical fields (e.g., language classification, news classification, hand-gesture recognition from electromyography (EMG) signals) without requiring simulations of neural networks with classically designed computing systems.

In summary, the concept of in-memory HDC is proposed, wherein nanoscale memristive devices organized in crossbar arrays are used to store the HD vectors associated with the IM and AM. The main computations of the HDC algorithm may be performed in-memory with logical and dot product operations on the memristive devices. Due to the inherent robustness of HDC to errors, it may be possible to approximate the mathematical operations associated with HDC to make it suitable for hardware implementation, and to use analog in-memory computing without significantly degrading the output accuracy. Hardware/software experiments using a prototype PCM chip deliver accuracies comparable to software baselines on language and news classification benchmarks with 10,000-dimensional HD vectors, making the here proposed concept actually the largest experimental demonstration of HDC with memristive hardware to date. A comparative study performed against a system-level design implemented using 65 nm CMOS technology showed that the in-memory HDC approach could result in >5×end-to-end savings in area and energy. Furthermore, HDC systems are well suited for solving high-level cognitive tasks, e.g., Raven's progressive matrices.

In the following, additional embodiments of the inventive concept will be described.

According to one advantageous embodiment of the device, the in-memory computing may be adapted to perform operations for inference tasks without altering the state of the memristive devices. Hence, once established, the "ground-state" of the memristive devices may stay constant during inference tasks so that the same set-up of the memristive devices may be used for a plurality of inference tasks.

According to an allowable embodiment of the device, the memristive devices may be selected out of the group comprising, phase-change memory devices, ionic thin-film memristive devices, spin-based memristive devices, and magnetic memristive devices. Basically, every device showing memristive characteristics may be used. It may also be noted that only two statuses have to be storable in the memristive device. Thus, the memristive devices used herein do not require a multi-status characteristic of typical memristive devices. Hence, compared to multi-status memristive devices, more simple ones may be used which may also be simpler and cheaper to produce and may require less space. Thus, the efficiency of the device—in particular the item memory and the associative memory—may be comparably high.

According to one preferred embodiment of the device, the item memory may comprise a crossbar array of memristive devices having as many memristive storage elements per row as the hyper-dimensional item vector has dimensions d. A typical number of memristive storage elements may be above 1000 per row, and typically in the range of 10.000 or more per row. Thus, a complete hyper-dimensional vector may be stored in a row. No partitioning may be required in the item memory; it may only be required if the number of columns is greater than what is permitted by electrical and physical characteristics of the used circuits. Consequently, a component-wise calculation involving the complete hyper-dimensional item vector may always be possible.

According to a further preferred embodiment of the device, the associative memory may comprise a crossbar array of memristive devices. Thereby, each profile hyper-dimensional vector may be partitioned into equally sized—in particular of size p—profile sub-hyper-dimensional vectors, such that each profile sub-hyper-dimensional vector is encodable as binary conductance states into the memristive devices of one of a plurality of rows comprised in the associative memory. Thus, a d-dimensional hyper-dimensional vector—in particular of the size of the hyper-dimensional vectors stored in the item memory—may be stored in a plurality of rows of equal size in the associative memory.

According to one advantageous embodiment, the device may also comprise a measurement unit adapted for measuring sub-hyper-dimensional vector currents resulting from applying query sub-hyper-dimensional vectors to corresponding profile sub-hyper-dimensional vectors. Therein, the query sub-hyper-dimensional vectors may be partitions of an equally partitioned—in particular of size p—query hyper-dimensional vector. Additionally, there may be an adder unit adapted for adding the respective sub-hyper-dimensional vector currents resulting in the distances between the query hyper-dimensional vector and the profile hyper-dimensional vector. This way, the distances between different hyper-dimensional profile vectors stored in the associative memory and a hyper-dimensional query may elegantly be measured. The measurements may be performed partition-wise one after the other. Thus, only a very limited number of cycles—in particular as many cycles as partitions are available—may be required to determine an inference result involving the query vector in light of the available profile vectors.

According to one additionally preferred embodiment of the device, the item memory and the query transformation unit may be portions of an encoder unit. During training, the hyper-dimensional profile vector per class to be predicted may be determinable by binding shifted versions of selected item memory vectors for generating binary n-gram hyper-dimensional vectors. Thereby, intermediate results of the binding operation may be storable in minterm buffers. The generation of a hyper-dimensional profile vector may involve bundling together the n-gram hyper-dimensional vectors into a sum hyper-dimensional vector by summing the respective n-gram hyper-dimensional vector elements, and by applying a threshold on the elements of the sum hyper-dimensional vector to determine binary hyper-dimensional profile vector elements.

Hence, the training of the device for a classification task may be pretty straightforward and may not require a large amount of samples. Additionally, the generation of the hyper-dimensional profile vectors—in particular one per class to be predicted—may only require a very limited number of cycles of the device. Thus, a very energy- and time-efficient training period may be available in order to train the device for new classification tasks. A continuous reprogramming does not—in contrast to classical neural networks—represent an unsurmountable hurdle.

According to another advantageous embodiment of the device, the item memory may comprise two symmetrical crossbar arrays. One of them may be adapted for storing the hyper-dimensional item vector, and the other one may be adapted for storing a complement of the hyper-dimensional item vector. Thus, at every time, the hyper-dimensional item vector, as well as its complement, may be available for encoding tasks. It is not required to generate complement values of the hyper-dimensional item vector such that the time required for generation of the hyper-dimensional item vectors remains constant.

According to one possible embodiment of the device, an output unit of the associative memory may comprise a plurality of multiplexers, a summing buffer and a winner-takes-it-all (WTA) unit for a determination of a result of the query as a class output of an inference task. Thus, by adding the portions of the partitions and determining the hyper-dimensional profile vector in the associative memory having the shortest distance to the hyper-dimensional query vector, a straightforward and clearly defined classification becomes possible.

According to one useful embodiment of the device, the distance between the hyper-dimensional query vector and a plurality of hyper-dimensional profile vectors in the associative memory may be determined by the Hamming distance or by the dot product between the respective vectors. The Hamming distance may lead to an easy computation of the distance between two vectors because only the evaluation of the number of bit differences in the elements of the vectors may be required.

According to one advantageous embodiment of the device, the query transformation unit may comprise for each dimension of the hyper-dimensional vectors a minterm buffer, a sum hyper-dimensional vector buffer, and a threshold unit. In some implementations, also additional logical circuits may be required. However, each dimension of the hyper-dimensional vector may be treated with own related logic gates. Thus, a complete parallel processing becomes possible. Basically, most operations may be performed in one cycle.

According to one helpful embodiment of the device, a controller, as a portion of the encoder, may be adapted for issuing control signals orchestrating a data movement from a query symbol sequence to a query hyper-dimensional vector at the output of the encoder according to a configuration pertaining to a query symbol sequence received via a configuration interface. Such a controlling unit may ensure that the individual steps within the encoder unit may be performed in a well-defined and reliable sequence in order to generate repeatedly the same results.

According to another helpful embodiment of the device, a second controller as a portion of an associative memory search module may be adapted for iterating through each partition of the query sub-hyper-dimensional vector and activating corresponding partitions in the associative memory to obtain partial distances. Additionally, the second controller may further activate the sum buffers, wherein full distance values may be accumulated and may validate the final inference output at the end of iterating through all partitions. The partitioning approach may be essential to counter the spatial variations of the memristive devices.

Furthermore, an efficient associative memory may be used which may not require a complete row-wise size of the hyper-dimensional profile vectors. Partitioning of the profile vector may reduce the required amount of space for the associative memory on the die. Depending on the size of the partitions—and thus the number of required rows in the associative memory—space usage on the die they may be optimized.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
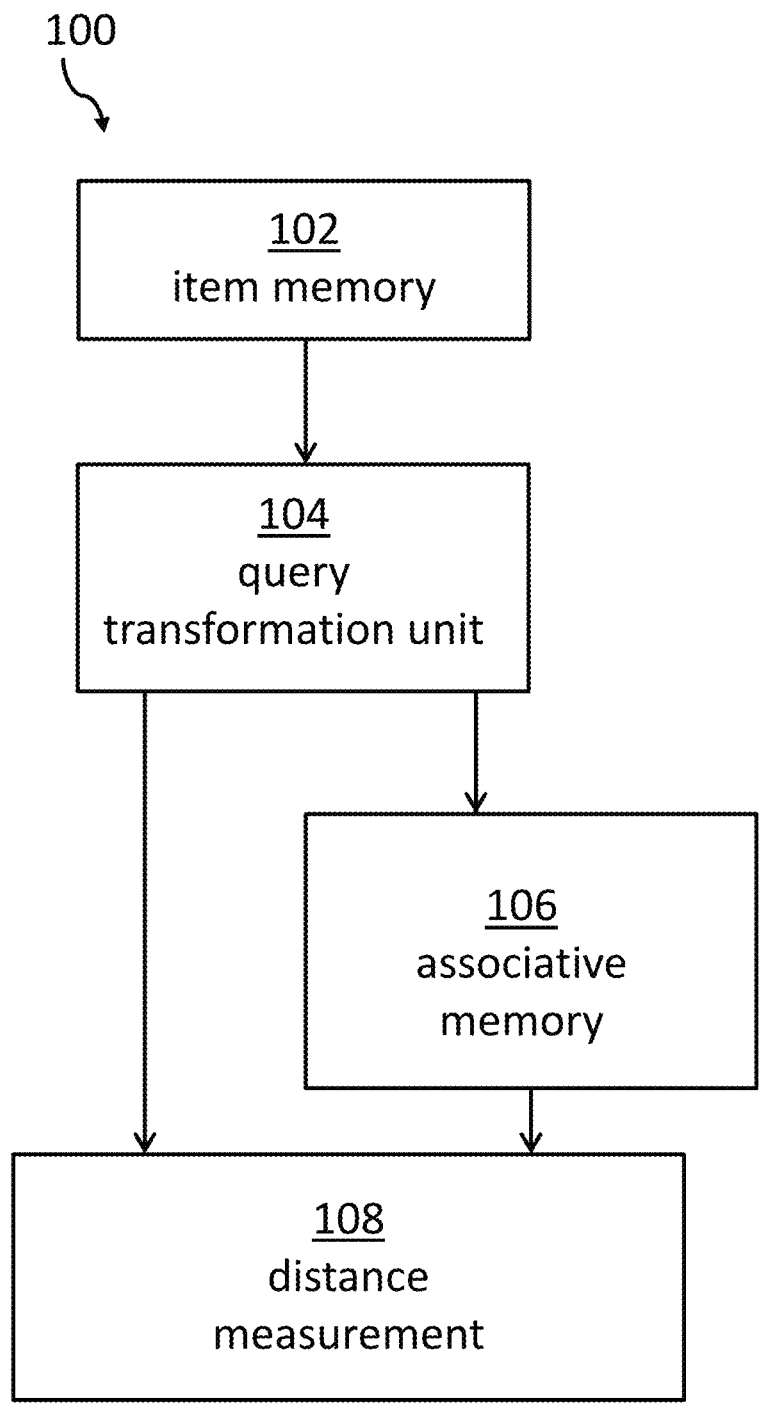

Preferred embodiments of the invention will be described, by way of example only, and with reference to the following drawings:

FIG. 1 shows a block diagram of an overview of the here proposed concept of the device for hyper-dimensional computing for inference tasks.

Figure 2:
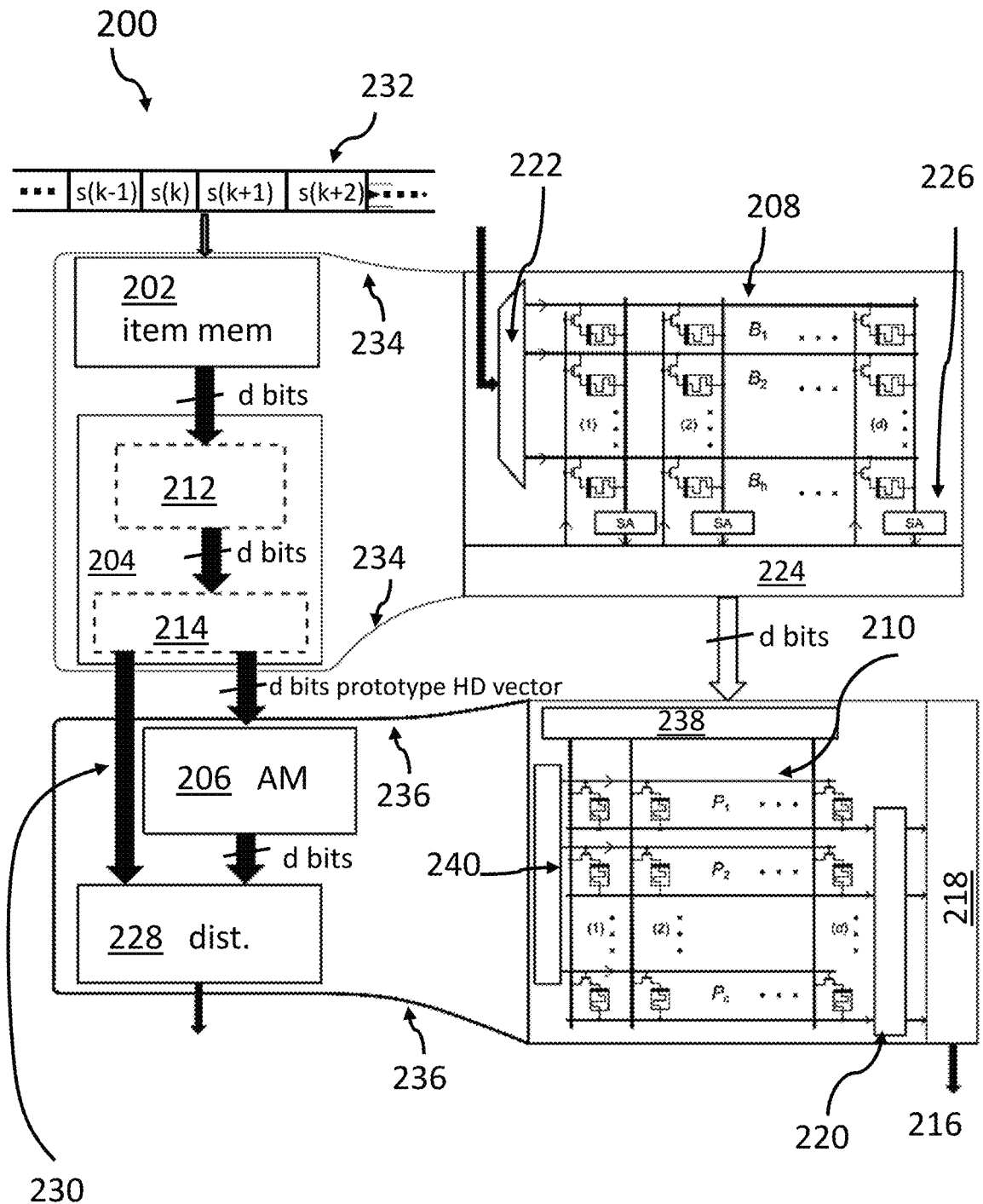

FIG. 2 shows a block diagram of a more detailed concept of an in-memory hyper-dimensional computing system.

Figure 3:
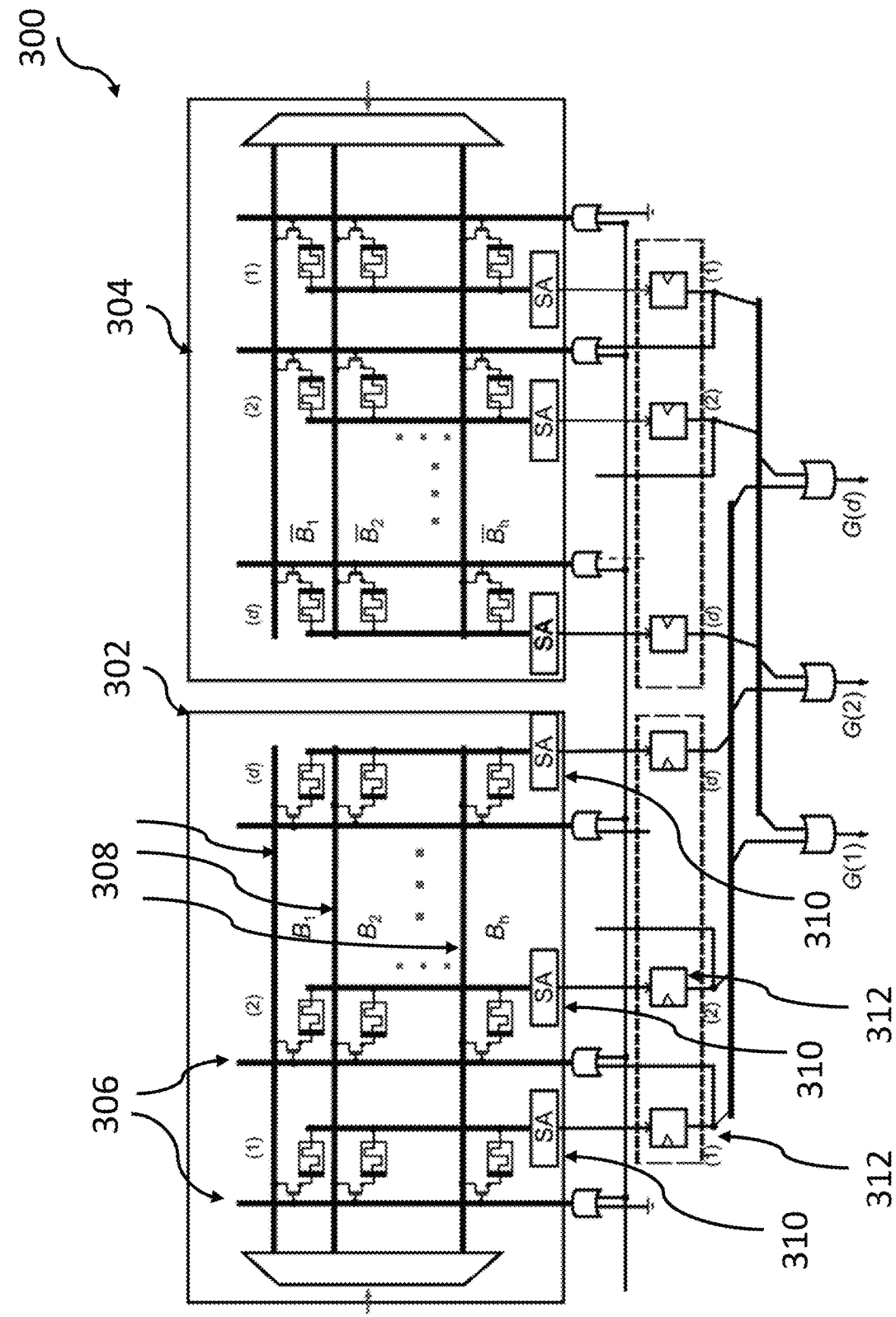

FIG. 3 shows a block diagram of an embodiment of an in-memory n-gram encoding unit based on 2 minterms.

Figure 4:
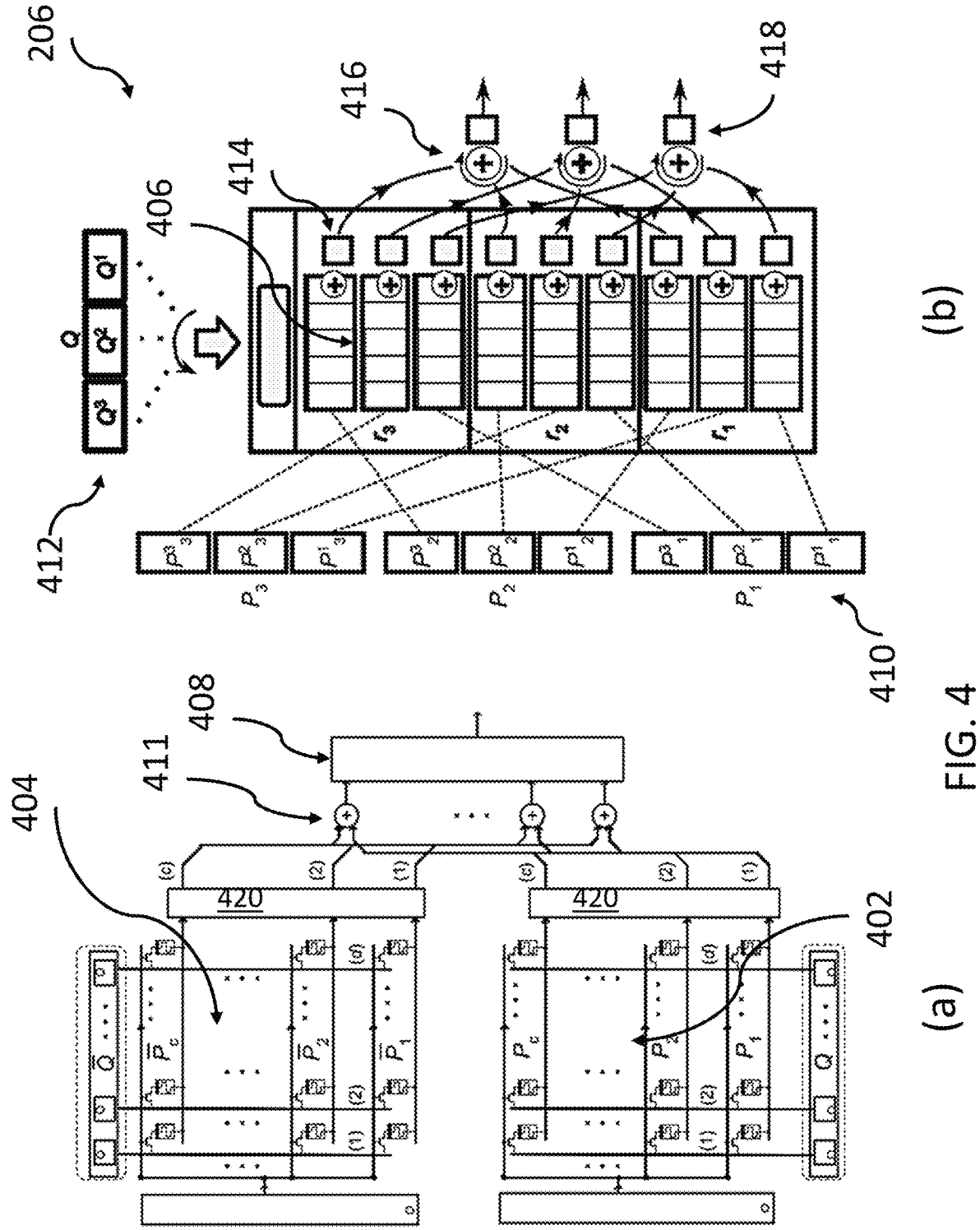

FIG. 4 shows the usage of an associative memory and the concept of the distance determination with partitioning.

Figure 5:
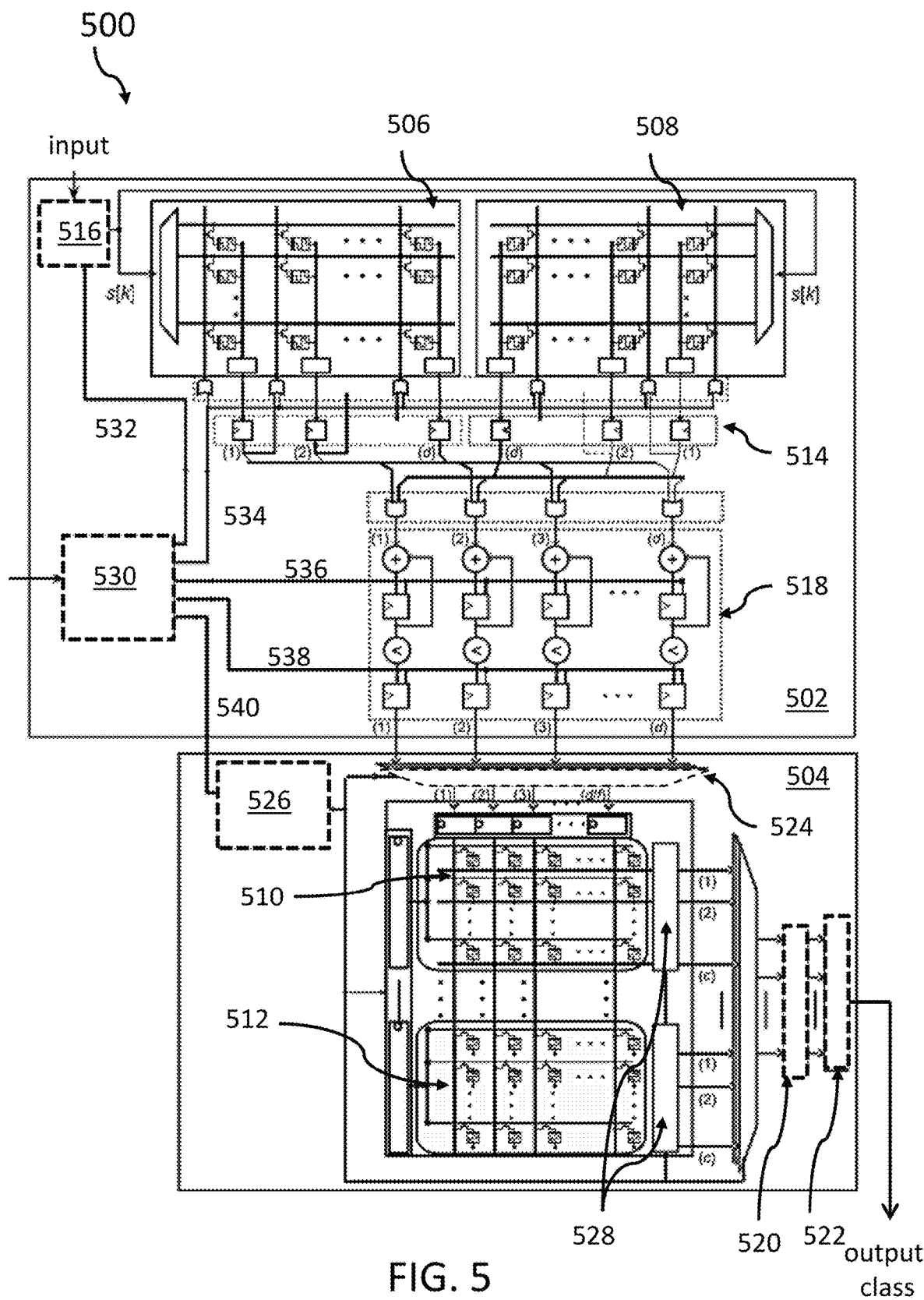

FIG. 5 shows a block diagram of a complete in-memory hyper-dimensional computing system.

Figure 6:
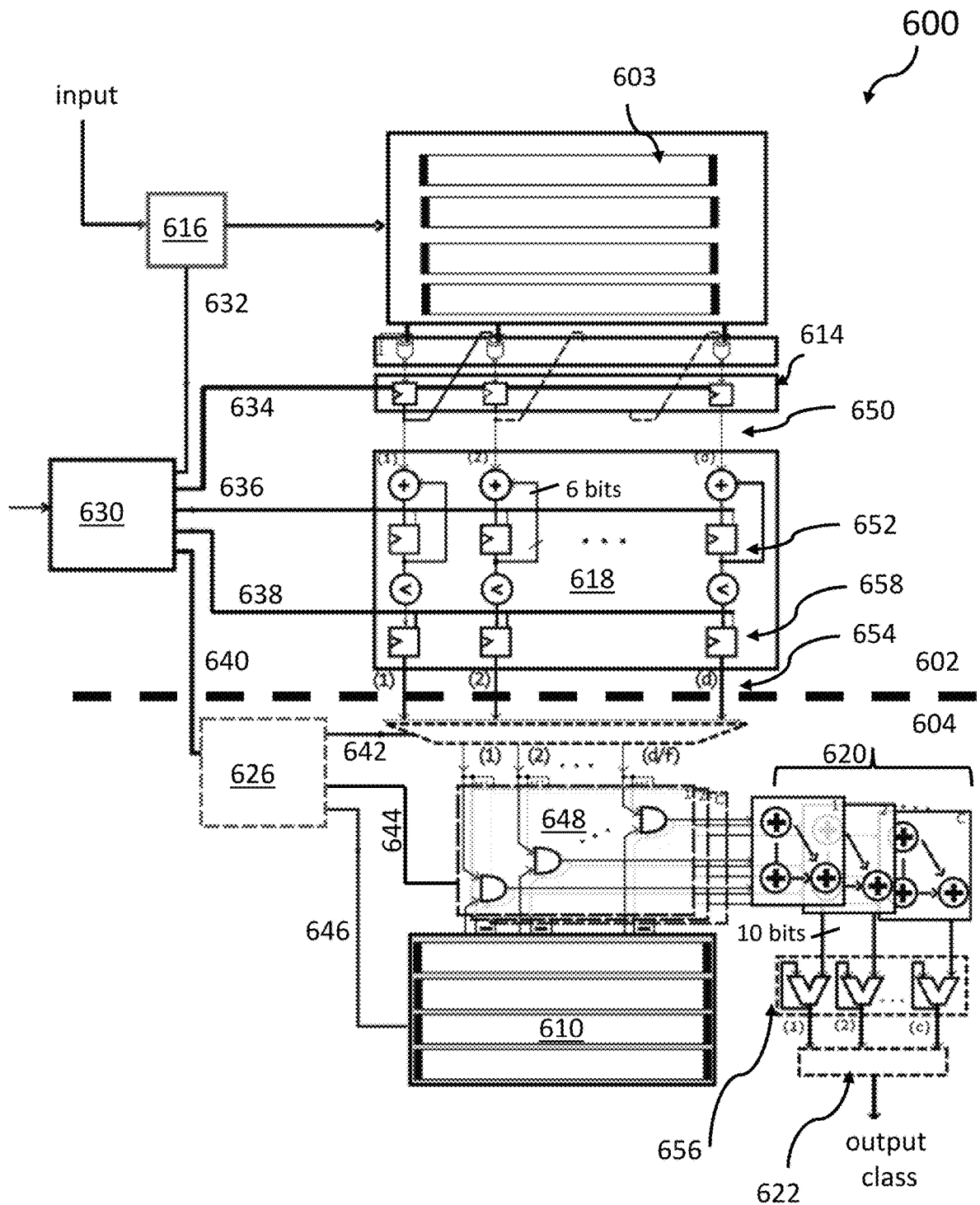

FIG. 6 shows an exemplary block diagram of a hyper-dimensional computing architecture.

Figure 7:
Figure 7:
Figure 7:

FIG. 7 shows a flowchart of a method relating to the here proposed concept for hyper-dimensional computing for inference tasks.

DETAILED DESCRIPTION

In the context of this description, the following conventions, terms and/or expressions may be used:

The term 'hyper-dimensional computing' may denote the concept of using very large binary vectors in the order of more than 1000 dimensions—typically, 10,000 dimensions or even more—in order to perform machine-learning tasks such as classifications. Pseudo-random hyper-dimensional vectors—sometimes also denoted as hypervectors—which comprise binary independent and identically distributed components may be generated during a training phase. Additionally, only simple/primitive computing operations—like mappings, permutations, inversions—may be required in order to encode or query information from related devices. In particular, if the dimensionality of the hyper-dimensional vector is in the thousands, there exists a huge number of quasi-orthogonal hyper-dimensional vectors.

Furthermore, the term hyper-dimensional computing may denote a brain-inspired non-von-Neumann machine-learning model based on representing information with high-dimensional vectors (thousands of dimensions, e.g., 10 k dimensions). Hyper-dimensional (HD) vectors—or exchangeably used high-dimensional vectors—are holographic, meaning that each bit position may have an equal weight in contrast to a conventional model with most significant bits and least significant bits. Additionally, the dimensional values of the hyper-dimensional vectors are (pseudo-) random with binary independent and identical distribution (i.i.d.) components.

By its nature, an HD computing device may be extremely robust in the presence of failure, defects, variations and noise, all of which make it very well suited for ultralow energy computation on nano-scale fabrics such as computational phase-change memory devices (PCM).

At its very core, HD computing is about manipulating and comparing large patterns within the memory. A processor based on HD computing may be seen as an extremely wide data flow processor with a small instruction set of bit-level operations.

For learning and inference tasks, the HD processor is composed of three main modules: an item memory for random projection to the HD space, an encoding unit, and an associative memory (together with distance computing).

The first two units may utilize a random indexing with multiply-add-permute (MAP) operations that may allow a high degree of parallelism by needing each hyper-vector component to communicate with only a local component or its immediate neighbors. In the associative memory, the distance computing may be performed in a distributed fashion; however, it is the only operation that requires a contribution from all the hyper-vector components.

The term 'inference task' may denote a step of reasoning, moving from premises to logical consequences. This term may typically be used in machine-learning contexts in which a query—in particular new, unknown information—may have to be sorted, i.e., classified to one of a given set of pre-trained classes. Typically, also a probability may be determined as how good a query may fit to one of the available classes of the machine-learning model.

The term 'item memory' may denote a memory being implemented as a crossbar of memristive elements being addressable by wordlines and bitlines. Each cross point of the crossbar may typically be equipped with a driver or select or FET and a memristive element. The item memory may have as many columns as the hyper-dimensional vectors may have dimensions. Thus, each memristive element of a row of the crossbar may store one bit, i.e., one dimension of the hyper dimensional vector. Thus, a complete hyper-dimensional vector may be stored in a row of the item memory.

Additionally, the item memory may comprise a second crossbar of the same size comprising memristive devices as the original crossbar. However, in the second crossbar the complement of the hyper-dimensional vector may be stored such that at every point in time the hyper-dimensional vector, as well as its complement, may be available for logical operations.

The term 'hyper-dimensional item vector' may denote a binary vector—i.e., only '1's and '0' may be stored as dimension elements—which may be derived from input information—randomly projected to the hyper-dimensional space. A plurality of the item vectors may be combined to form n-grams for further processing.

The term 'query transformation unit' may denote a portion of the device enabled to encode a query in the same way the training examples have been encoded. This way, an easy comparison—in form of a distance measurement—between the profile vectors, which are the result of the training, and the query vector becomes possible. Thereby, it may be useful that the dimensionality of the hyper-dimensional query vector and the hyper-dimensional profile vectors is the same.

The term 'hyper-dimensional query vector' may denote a vector generated from a query input which may have been encoded in the same way, the hyper-dimensional profile vectors have been generated. This way, the same unit—i.e., query transformation unit—may be used to generate the hyper-dimensional profile vectors, as well as the hyper-dimensional query vector. Thus, the available units may be used in a very efficient way.

The term 'hyper-dimensional profile vector' may denote a vector of dimensionality d being generated during a training session of the device, wherein each HD profile vector may represent one class among those that may be predicted by the device. The HD profile vectors may all be stored in the associative memory. They may have been generated during a training session one after the other.

The term 'profile sub-hyper-dimensional vectors' may denote a portion of an equally partitioned HD profile vector. Thus, a plurality of portions may be stored in the associative memory of the device.

The term 'hyper-dimensional base vectors' may denote—so to speak—the alphabet or base information units—available to set up the device for training purposes as well as for query or inference purposes. The HD (hyper-dimensional) base vectors all may be stored in the item memory. Thus, the item memory may have as many rows of memristive elements as HD base vectors are available. During training, the information relating to the training examples may be encoded using the base vectors in the item memory.

The term 'associative memory' may denote a special type of computer memory—in particular, a passive storage device for hyper-dimensional vectors, e.g., in partitioned form—used in high-speed searching applications. It may be adapted to compare input search data (query data) against a plurality of stored data (i.e., profile vectors). It may return the result of the query by measuring a distance between the query vector and the stored profile vectors.

The term 'distance' may denote a result of a mathematical method. As examples, the inverse Hamming distance or the dot product between two vectors (one of the profile vectors and a query vector at a time) may be applicable.

The term 'minterm buffer' may denote a plurality of one-bit buffers, where the plurality may be equivalent to the number of dimensions of the HD vectors. The minterm buffer may be adapted for storing individual bit values of a minterm generated by a single encoding operation.

The term 'accumulation buffer' may denote a plurality of one-bit accumulation buffers, where the plurality may be equivalent to the number of dimensions of the HD vectors. The accumulation buffer may be adapted for storing individual bit values of combined operations of a plurality of encoding operations. The accumulation buffer output represents the n-gram of a plurality of input HD vectors.

The term 'in-memory computing' may denote the paradigm leading away from the classical von-Neumann computing architecture in which data are fetched from memory, moved to a processing unit, being processed in the processing unit and moved back to the memory. This traditional process computing approach is very time and energy intensive. In contrast, in-memory computing may allow computations on the data directly in the storage components. Thus, time and energy consuming movement of data may widely be avoided. This may make computer operations faster and much more energy-efficient.

The term 'memristive device' may denote memristive components of passive two-terminal electrical components relating electric charge and magnetic flux linkage. The memristive device may comprise a plurality of memristors which electrical resistance is not constant but depends on the history of current that has been previously flown through the device, i.e., the present resistance may depend on how much electric charge has flown in what direction through it in the past. Thus, the device remembers its history. When electric power supply used for writing information into the device is turned off, the memristor "remembers" its most recent resistance until it is turned on again. Memristors may, e.g., be implemented using thin films of titanium dioxide. Many other material compositions may be available for memristive devices, often implemented in the form of phase change devices. A memristor may be also composed of a plurality of transistors, resistors, capacitors, inductors, and/or floating-gate devices, jointly emulating a behavior of a memristor device.

The term 'crossbar array' may denote an array of components—in particular memristive 2D components—in which word-lines (thought to be horizontal in a graphical representation) and bit-lines (thought to be vertical in a graphical representation) cross each other. At each crossing a component may be selectable and activatable by a related bit activation line. The word-line may be used for a selection of a particular stored HD vector (thought to be stored in components of a horizontal line in a graphical representation).

The term 'measurement unit' may denote a determination unit for determining a distance between vectors, in particular here as Hamming distance or dot product distance.

The term 'partitioned query hyper-dimensional vector' may denote that the HD query vector may be split into equally sized portions of size p.

The term 'adder unit' may denote a circuit for adding components of vectors, in particular to determine the distance result.

The term 'encoder unit' may denote a combined unit of the item memory and the binding unit and bundler.

The term 'n-gram' may denote, in the fields of computational linguistics and probability, a contiguous sequence of n items from a given sample of text (or speech). The items may be phonemes, syllables, letters, words or base pairs according to the application. The n-grams are typically collected from a text or speech corpus. When the items are words, n-grams may also sometimes be called shingles. An n-gram of size 1 may be referred to as a "uni-gram"; size 2 is a "bi-gram" (or, less commonly, a "di-gram"); size 3 is a "tri-gram".

The term 'binding' (or binding operation) may typically denote a multiply operation of HD vectors in the form of an XOR operation which makes the resulting output vector quasi-orthogonal to the operand vectors. Thus, the number of dimensions of the input vectors of a binding operation and the number of dimensions of the resulting output vector relate to the same hyper-dimensional space.

The term 'binary n-gram hyper-dimensional vectors' may denote a binary vector of dimensionality d being generated as a result of the according operation in the item memory.

The term 'intermediate results' may denote non-final results of the binding operation performed to build the n-gram HD vector (either profile HD vector or query HD vector). The minterm buffers (i.e. one latch for every dimension of the d dimensions) may function as intermediate storage before these intermediate results are added in the accumulation buffers (i.e., one latch for every dimension of the d dimensions) to form the n-gram HD vector. The n-gram HD vectors are then bundled together building one of the profile vectors or the query vector.

The term 'minterm buffers' may denote a plurality of latches—in particular one for each dimension of the HD vector—for an intermediate storage of results of the binding operation in the item memory.

The term 'winner-takes-it-all (WTA) unit' may denote a circuit for determining one of a plurality of input signals having the highest value.

The term 'Hamming distance' between two vectors (or strings) of equal length may denote the number of positions at which the corresponding symbols in the dimensions of the vectors are different. In other words, it measures the minimum number of substitutions required to change one string into the other, or the minimum number of errors that could have transformed one string into the other.

The term 'query symbol sequence' may denote a sequence of low dimension encoded symbols of a query. In the here-used example of language classification, it may be a sequence of letters/words in a specific language to be classified.

Before focusing on the details of the figures, the general concept of in-memory hyper-dimensional computing (HPC) should be described:

When HDC is used for learning and classification, first, a set of i.i.d., hence quasi-orthogonal HD vectors, referred to as basis HD vectors, are selected to represent each symbol associated with a dataset. For example, if the task is to classify an unknown text into the corresponding language, the symbols could be the letters of the alphabet. The basis HD vectors stay fixed throughout the computation. Assuming that there are h symbols, $\{s_i\}^h_1$, the set of the h, d-dimensional basis HD vectors $\{B_i\}^h_1$ is referred to as an item memory (IM) (see also FIG. 2 below). Basis HD vectors serve as the basis from which further representations are made by applying a well-defined set of component-wise operations: addition of binary HD vectors [+] is defined as the component-wise majority, multiplication (⊕) is defined as the component-wise exclusive-OR (or equivalently as the component-wise exclusive-NOR), and finally permutation (ρ) is defined as a pseudo-random shuffling of the coordinates. Applied on dense binary HD vectors where each component has equal probability of being 0 or 1, all these operations produce a d-bit HD-vector resulting in a closed system.

Subsequently, during the learning phase, the basis HD vectors in the IM are combined by the component-wise operations inside a designed encoder to compute for instance an n-gram HD vector representing an object of interest; and to add n-gram HD vectors from the same category of objects to produce a prototype (or profile) HD vector representing the entire class of category during learning. In the language example, the encoder would receive input text associated with a known language and would generate a prototype HD vector corresponding to that language. In this case, n determines the smallest number of symbols (letters in the example) that are combined while performing an n-gram encoding operation. The overall encoding operation results in c, d-dimensional prototype HD vectors (referred to as associative memory (AM)) assuming there are c classes. When the encoder receives n consecutive symbols, {s[1],s[2], . . . ,s[n]}, it produces an n-gram HD vector, G, given by:

$$G(s[1]s[2], \ldots, s[n]) = B[1] \oplus \rho(B[2]) \oplus \ldots \oplus \rho^{n-1}(B[n]), \quad (1)$$

wherein B[k] corresponds to the associated basis HD vector for symbol, s[k]. The operator ⊕ denotes the exclusive-NOR, and p denotes a pseudo-random permutation operation, e.g., a circular shift by 1 bit. The encoder then bundles several such n-gram HD vectors from the training data using component-wise addition followed by a binarization (majority function) to produce a prototype HD vector for the given class.

When inference or classification is performed, a query HD vector (e.g., from a text of unknown language) is generated identical to the way the prototype HD vectors are generated. Subsequently, the query HD vector is compared with the prototype HD vectors inside the AM to make the appropriate classification. Equation 2 defines how a query HD vector Q is compared against each of the prototype HD vector Pi out of c classes to find the predicted class with maximum similarity. This AM search operation can for example be performed by calculating the inverse Hamming distance.

$$\text{Class}_{Pred} = \underset{i \in \{1,\ldots,c\}}{\operatorname{argmax}} \sum_{j=1}^{d} Q(j) \oplus P_i(j) \quad (2)$$

One key observation is that the two main operations presented above, namely, the encoding and AM search, are about manipulating and comparing large patterns within the memory itself. Both, IM and AM (after learning) represent permanent HD vectors stored in the memory. As a lookup operation, different input symbols activate the corresponding stored patterns in the IM that are then combined inside or around memory with simple local operations to produce another pattern for comparison in AM. These component-wise arithmetic operations on patterns allow a high degree of parallelism as each HD vector element needs to communicate with only a local component or its immediate neighbors.

This highly memory-centric aspect of HDC is a key motivation for the in-memory computing implementation proposed in this work.

The essential idea of in-memory HDC is to store the elements of both, the IM and the AM as the conductance values of nanoscale memristive devices organized in crossbar arrays (see FIG. 2). The IM of h rows and d columns is stored in the first crossbar, where each basis HD vector is stored on a single row. To perform ⊕ operations between the basis HD vectors for the n-gram encoding, in-memory read logic is employed. Additional peripheral circuitry is used to implement the remaining permutations and component-wise additions needed in the encoder. The AM of c rows and d columns is implemented in the second crossbar, where each prototype HD vector is stored on a single row. During supervised learning, each prototype HD vector output from the first crossbar gets programmed into a certain row of the AM based on the provided label. During inference, the query HD vector output from the first crossbar is input as voltages on the wordline driver, to perform the distance computation in AM using in-memory dot-product.

This design ideally fits the memory-centric architecture of HDC because it allows performing the main computations on the IM and AM within the memory units themselves with a high degree of parallelism. Furthermore, the IM and AM are only programmed once while training on a specific dataset, and do not change anymore during the execution of the HDC algorithm for inference because only read operations are performed for the in-memory computations.

Therefore, non-volatile resistive memory is very well suited for implementing the IM and AM, and only binary conductance states are required. Exemplary, PCM technology was used, which operates by switching a phase-change material between amorphous (high resistance) and crystalline (low resistance) states to implement binary data storage. The here proposed concept uses PCM as successful technology for realizing in-memory HDC systems.

In the remaining part of this document, we will elaborate the detailed designs of the associative memory, the encoder, and finally propose a complete in-memory HDC system that achieves a near-optimum trade-off between design complexity and output accuracy. The system performance will be validated through experiments using a prototype PCM chip fabricated in 90 nm CMOS technology, and a complete system-level design, implemented using 65 nm CMOS technology, will be considered to compare the system characteristics of a full CMOS implementation with those of a PCM crossbar.

Some additional remark should also be made regarding the used datasets—among a large variety of other possible input data—to verify the functionality of the here proposed concept. This may make the figures better understandable. Three highly relevant learning and classification tasks to evaluate the proposed in-memory HDC architecture have been targeted. The following three tasks are used to benchmark the performance of in-memory HDC in terms of classification accuracy successfully.

1. Language classification: In this task, HDC is applied to classify raw text composed of Latin characters into their respective language. The training texts are taken from the Wortschatz Corpora where large numbers of sentences (about a million bytes of text) are available for European languages. Another independent dataset, Europarl Parallel Corpus, with 1,000 sentences per language is used as the test dataset for the classification. The former database is used for training prototype HD vectors for each of the languages while the latter is used to run inference on the trained HDC model. For the subsequent simulations and experiments with the language dataset we use dimensionality d=10,000 and n-gram size n=4. An item memory of 27 symbols has been used, representing the 26 letters of the Latin alphabet plus a whitespace character. Training is performed using the entire training dataset, containing a labeled text of 120,000-240,000 words per language. For inference, a query is composed of a single sentence of the test dataset, hence in total 1,000 queries per language are used.

2. News classification: The news dataset comprises a database of Reuters news articles, subjected to a light weight preprocessing step, covering 8 different news genres. The pre-processing step removes frequent "stop" words and words with less than 3 letters. The training set has 5400+ documents while the testing set contains 2100+ documents. For the subsequent simulations and experiments with news dataset we use dimensionality d=10,000 and n-gram size n=5. Similar to the language task, an IM of 27 symbols is used, representing the 26 letters of the Latin alphabet plus a whitespace character. Training is performed using the entire training dataset where all labeled documents pertaining to the same class are merged into a single text. This merged text contains 8,000-200,000 words per class. For inference, a query is composed of a single document of the test dataset.

3. Hand gesture recognition from Electromyography (EMG) signals: In this task, the focus is on a use of HDC in a smart prosthetic application, namely hand gesture recognition from a stream of EMG signals. A database that provides EMG samples recorded from four channels covering the forearm muscles is used for this benchmark. Each channel data is quantized into intensity levels of electric potential. The sampling frequency of the EMG signal is 500 Hz. A label is provided for each time sample. The label varies from 1 to 5 corresponding to five classes of performed gestures. This dataset is used to train an HDC model to detect hand gestures of a single subject. For training on EMG dataset, a spatial encoding scheme is first employed to fuse data from the four channels so the IM has four symbols, and it is paired with a continuous item memory to jointly map the intensity levels per channel. The spatial encoding creates one HD vector per time sample. Then, a temporal encoding step is performed, whereby n consecutive spatially encoded HD vectors are combined into an n-gram. For the subsequent simulations and experiments with EMG dataset we use dimensionality d=10,000 and n-gram size n=5. Training and inference are performed using the same EMG channel signals from the same subject, but on non-overlapping sections of recording. The recording used for training contains 1280 time samples after down-sampling by a factor of 175. For inference, 780 queries are generated from the rest of recording where each query contains 5 time samples captured with the same down-sampling factor.

TABLE 2

| Dataset | Item Memory (IM) | | Associative Memory (AM) | |
|---|---|---|---|---|
| | # Symbols h | Dimensionality d | Dimensionality d | # Classes c |
| Language | 27 | 10,000 | 10,000 | 22 |
| News | 27 | 10,000 | 10,000 | 8 |
| EMG | 4 | 10,000 | 10,000 | 5 |

Table 2 provides details on the dimensions of the IM and AM for the different tasks. For EMG dataset, the HD vectors for the encoding operation are drawn by binding items from a pair of IM and continuous IM. In hardware implementation of in-memory HDC, the IM and AM may be distributed into multiple narrower crossbars in case electrical/physical limitations arise.

FIG. 1 shows a block diagram of an overview of the proposed device 100 for hyper-dimensional computing for inference tasks. The device comprises an item memory 102 for storing hyper-dimensional item vectors, and a query transformation unit 104 in connection with item memory 102. The query transformation unit 104 is adapted for forming a hyper-dimensional query vector from a query input (not shown) and hyper-dimensional base vectors stored in the item memory 102. An associative memory 106 is adapted for storing a plurality of hyper-dimensional profile vectors and for determining a distance between the hyper-dimensional query vector and the plurality of hyper-dimensional profile vectors. A related distance measurement unit 108 may be used for this task. Generally, the item memory 102 and the associative memory 106 are designed for in-memory computing using memristive devices. The details of the overview blocks of this block diagram will be explained in more detail in the subsequent figures.

FIG. 2 shows a block diagram of a more detailed concept 200 of in-memory hyper-dimensional computing. Some of the summarized functions of FIG. 1 can also be recognized. The left side of the FIG. 2 shows a more coarse-grain method-oriented block diagram, while the right side of FIG. 2 illustrates a realization using the in-memory computing approach. An item memory stores h d-dimensional basis HD vectors that correspond to the symbols associated with a given classification problem. During learning, based on a labeled training dataset, a query transformation unit performs dimensionality preserving mathematical manipulations on the basis HD vectors to produce c, d-dimensional prototype HD vectors that are stored in an associative memory. During classification, the same query transformation unit 204 generates a query HD vector based on a test example. Subsequently, an associative memory search is performed between the query HD vector and the elements of the associative memory 206 to determine the class to which the test example belongs. In in-memory HDC, the item memory 202 and the associative memory 206 are mapped onto crossbar arrays 208, 210 of memristive devices respectively. The predicted output class may be extracted from the peripheral circuit 218 relating to the crossbar array 210 after signals have passed a plurality of analog-to-digital converters (ADC) 220. Basically, in order to classify a given example, a distance computation function in 228 compares the difference between the query HD vector 230 and the prototype or profile HD vectors in the associative memory 206. The profile HD vector, having the smallest distance to the query HD vector 230, represents the predicted class 216 relating to the input example.

The mathematical operations associated with encoding and associative memory search are performed in-place by exploiting in-memory read logic and dot product operations, respectively. Exemplary, the dimensionality of d=10,000 may be used. The encoder 204 comprises an n-gram encoding unit 212 and a bundler 214, to be discussed later.

It may be recognized that the crossbar arrays 208 and 210 comprise also a plurality of peripheral circuits like a multiplexer 222, minterm buffers, i.e., peripheral circuits 224, sense amplifiers (SA) 226, as well as wordline drivers 238 and gate controllers 240.

The input example—using a language classification example—is provided as input stream 232 of individual letters to the item memory 202.

It may also be noted that by the relationship lines 234, the function of the item memory 202 and the encoder 204 should be understood as expounded to the in-memory implementation of the crossbar array 208. In the same sense, the associative memory 206 and the distance measurement unit 228 should be understood as expanded to the crossbar array 210 (i.e., with their peripheral circuits) by indicator lines 236.

FIG. 3 shows a block diagram 300 of an embodiment of an in-memory n-gram encoding unit based on 2 minterms.

This section will focus on the design of the n-gram encoding module or unit. As described above, one of the key operations associated with the encoder is the calculation of the n-gram HD vector given by equation (1). In order to find in-memory hardware friendly operations, Equation (1) is re-written as the component-wise summation of $2^{n-1}$ minterms given by equation (3).

$$G = \sum_{j=0}^{2^{n-1}-1} L_{1,j}(B[1]) \wedge \rho(L_{2,j}(B[2])) \wedge \ldots \wedge \rho^{n-1}(L_{n,j}(B[n])) \quad (3)$$

where the operator $L_{k,j}$ is given by $$L_{k,j}(B[k]) = B[k] \text{ if } (-1)^{Z(k,j)} = 1$$
$$= \overline{B[k]} \text{ otherwise,}$$

where $Z(k, j) = \text{floor}\{(½^k)(2j+1+2^{k-1})\}$, $k \in \{1, 2, \ldots, n\}$ is the item HD vector index within an n-gram and $j \in \{0, 1, \ldots, 2^{n-1}-1\}$ is used to index minterms.

The representation given by Equation (3) can be mapped into memristive crossbar arrays 302, 304, wherein a bitwise AND ($\wedge$) function is naturally supported through analog scalar multiplication. However, the number of minterms ($2^{n-1}-1$) rises exponentially with the size n of the n-gram, making the hardware computations costly. Therefore, it is desirable to reduce the number of minterms and to use a fixed number of minterms independent of n.

It can be shown that when n is even, there exists a 2-minterm approximation to equation (3), see above, given by $$G|\approx(B[1]\wedge\rho(B[2])\wedge \ldots \rho^{n-1}(B[n]))\vee(\overline{B[1]}\wedge\rho(\overline{B[2]})\wedge \ldots \rho^{n-1}(\overline{B[n]})) \quad (4)$$

Here, this 2-minterm based approximation for in-memory HDC shall be used. A schematic illustration of the corresponding n-gram encoding system is presented in FIG. 3. The basis HD vectors are programmed on one of the crossbars 302 and their complement HD vectors are programmed on the second crossbar 304. The component-wise logical AND operation between two HD vectors in Equation (4) is realized by applying one of the HD vectors as the gate control lines 306 (exemplarily indicated) of the crossbar 302, while selecting the wordline 308 of the second HD vector. The result of the AND function from the crossbar 302 is passed through an array of sense amplifiers (SA) 310 to convert the analog values to binary values. The binary result is then stored in the minterm buffer(s) 312, whose output is fed back as the gate control lines 306 by a single component shift to the right (left in the complementary crossbar 304). This implements the permutation operation in n-gram encoding, as shown in Equation (3). By performing these operations n times, it is possible to generate the n-gram.

To test the effectiveness of the encoding scheme with in-memory computing, simulations were carried out using the PCM statistical model. The training was performed in software with the same encoding technique used thereafter for inference, and both, the item memory (FIG. 2, 202) and the associative memory (FIG. 2, 206) are implemented with modeled PCM crossbars for inference.

The simulations were performed only on a language and news classification dataset, respectively, because for the EMG (electromyography) dataset the HD vectors used for the n-gram encoding are generated by a spatial encoding process and cannot be mapped entirely into a fixed item memory of reasonable size. From the experimental results, it is clear that the all-minterm approach to encoding provides the best classification accuracy in most configurations of the associative memory, as expected. However, the 2-minterm based encoding method yields a stable, and in some cases, particularly in the language dataset, similar accuracy level to that of the all-minterm approach, while significantly reducing the hardware complexity. The 2-minterm approximation also appears to provide satisfactory results when n is odd according to conducted experiment, even though the second minterm in equation (4) shows up in equation (3) only when n is even.

It may be noted that reference numerals are used for the left crossbar 302 because it is symmetrical to the crossbar 304 for storing the complements of the item vectors.

FIG. 4 shows a block diagram of the usage of an associative memory 206 (compare FIG. 2) and the concept of the distance determination. It may be used to compute an inverse Hamming distance (invHamm) similarity metric value. Two PCM (phase change memory) crossbar arrays 402, 404 of c rows and d columns are employed (see FIG. 4a).

In FIG. 4b, there is a schematic illustration of the coarse-grained randomization strategy employed to counter the spatial variations associated with the crystalline PCM state. Experimental results of a classification task have shown that the experimental on-chip accuracy results compare favorably with 10-partition simulation results and software baseline for both similarity metrics on three exemplary datasets.

Classification involves an AM (associative memory) search between the prototype HD vectors and the query HD vector using a suitable similarity metric, such as the inverse Hamming distance (invHamm) computed from equation (2). Using associativity of addition operations, the expression in equation (2) can be decomposed into the addition of two dot product terms, as shown in equation (5)

$$\text{Class}_{Pred} = \underset{i \in \{1,\ldots,c\}}{\text{argmax}} Q \cdot P_i + \overline{Q} \cdot \overline{P_i} \simeq \underset{i \in \{1,\ldots,c\}}{\text{argmax}} Q \cdot P_i \quad (5)$$

where $\overline{Q}$ denotes the logical complement of Q. Since the operations associated with HDC ensure that both, the query and prototype HD vectors, have an almost equal number of zeros and ones, the dot product (dotp) $\text{argmax}_{i \in \{1, \ldots, c\}} Q \cdot P_i$ can also serve as a viable similarity metric.

To compute the invHamm similarity metric value, two PCM crossbar arrays 402, 404 of c rows and d columns are used with respective ADCs 420, as shown in FIG. 4a. The prototype HD vectors $P_i$ are programmed into one of the crossbar arrays as conductance states. Binary '1' elements are programmed as crystalline states and binary '0' elements are programmed as amorphous states of the memristive elements. The complementary HD vectors of $P_i$ are programmed in a similar manner into the second crossbar array. The query HD vector Q and its complement $\overline{Q}$ are applied as voltage values along the wordlines of the respective crossbars. In accordance with the Kirchoff's current law, the total current on the $i^{th}$ bitline is equal to the dot product between query HD vector and $i^{th}$ prototype HD vector. The results of the dot product operations from the two arrays are added in a pairwise manner using a digital adder circuitry 411 in the periphery and are subsequently input to a winner-takes-it-all (WTA) circuit 408 which outputs a '1' only on the bitline corresponding to the class of maximum similarity value. When a dotp similarity metric is considered, only the crossbar 402 encoding $P_i$ is used (and not crossbar 404) and the array of adders 411 in the periphery is eliminated, resulting in reduced hardware complexity.

Experiments were performed using a prototype PCM chip to evaluate the effectiveness of the proposed implementation on three common HDC benchmarks: language classification, news classification, and hand gesture recognition from electromyography (EMG) signals. In those experiments, the prototype HD vectors (and their complements) are learned beforehand in software and are then programmed into the PCM devices on the chip. Inference is then performed with a software encoder and using Equation (5) for the associative memory search, in which all multiplication operations are performed in the analog domain (by exploiting the Ohm's law) on-chip and the remaining operations are implemented in software.

However, it was found that, when a naive mapping of the prototype HD vectors to the array is used, the chip-level variability associated with the crystalline state detrimentally affects the AM search operation. Experiments have unveiled that the device conductance in the left half of the array tends to be higher than the right half. When prototype HD vectors are programmed in the class order into the array, this unbalance naturally creates a bias towards classes programmed into the left half, reducing the classification accuracy.

To address this issue, a coarse grained randomization strategy was employed where the idea is to segment the prototype HD vector and to place the resulting segments spatially distributed across the crossbar array (see FIG. 4b). This helps all the components of prototype HD vectors to uniformly mitigate long range variations. The proposed strategy involves dividing the crossbar array into f equal sized partitions 406 ($r_1, r_2, \ldots, r_f$) and storing a 1/f segment of each of the prototype HD vectors ($P_1, P_2, \ldots, P_c$) per partition. Here, f is called the 'partition factor' and it controls the granularity associated with the randomization. To match the segments of prototype HD vectors, the query vector is also split into equal sized sub-vectors $Q^1, Q^2, \ldots, Q^f$, which are input sequentially to the wordline drivers of the crossbar.

A model developed based on the statistical properties of PCM devices was used to evaluate the effectiveness of the coarse-grained randomized partitioning method on classification accuracy. Simulations were carried out for different partition factors 1, 2 and 10 for the two similarity metrics dotp and invHamm. These results indicate that the classification accuracy increases with the number of partitions. For instance, for the language classification the accuracy improves from 82.5% to 96% with dotp by randomizing with a partition factor of 10 instead of 1. The experimental on-chip accuracy results (performed with a partition factor of 10) are close to the 10-partition simulation results and the software baseline for both similarity metrics on the three tested datasets. When the two similarity metrics are compared, invHamm provides slightly better accuracy for the same partition size, at the expense of almost doubled area and energy consumption. Therefore, for low-power applications, a good trade-off is the use of dotp similarity metric with a partition factor of 10.

FIG. 4b shows the distance measuring between the HD query vector 412 and the HD profile vectors $P_1, P_2, P_3$ 410 exemplarily. The HD profile vectors 410 are partitioned and each partition is stored in one of the regions $r_1, r_2, r_3$ of the associative memory 206. Also the HD query vector 412 is partitioned into portions $Q^1, Q^2, Q^3$ of equal size as the partitions of the HD profile vectors 410. Relating to each column, the bitline accumulates the analog result of the operation between the portion of the profile vector 410 and the portion of the query vector of 412. For each region $r_1, r_2, r_3$, and each partition within a region, an ADC converter 414 presenting digital results is available. Additionally, for all regions together, the group of adder units 416 and a WTA unit 418 is available to determine the class of the inference process represented by a specific profile vector 410 that is closest to the query vector 412.

FIG. 5 shows a block diagram of a complete in-memory hyper-dimensional computing system 500. Additionally, some associated experimental results are presented. The proposed architecture comprises the 2-minterm encoder 502 and a dotp similarity metric unit with a partition factor of 10, as this provides a good trade-off between classification accuracy and hardware complexity. As shown, the proposed architecture has three PCM crossbar arrays 506, 508 and 510, 512 (with respective ADCs 528)—two having h rows and d columns, and one having c·f rows and d/f columns, with e.g., f=10.

The system 500 includes several peripheral circuits: an index buffer 516, a minterm buffer 514, controller 530 and a bundler 518 which reside inside the encoder 502, whereas the AM search module 504 contains a sum buffer 520 and a comparator circuit 522 (WTA). The index buffer 516 is located at the input of the IM to keep the indices of the symbols in the sequence and to feed them into the crossbar 506, 508 rows. The bundler 518 accumulates the n-gram HD vectors to produce a sum HD vector (in the middle line latches of the bundler 518). Once thresholds are applied on the sum HD vector, the result is a prototype HD vector at the time of training or a query HD vector at the time of inference. During inference, one segment of the query HD vector at the output buffer of the encoder 502 is fed at a time to the AM 504 through an array of multiplexers 524, so that only the corresponding partition is activated in the AM 504. Depending on the partition that is selected, the relevant gates are activated through a controller 526 sitting inside the AM search module 504. Finally, the results in the sum buffer 520 (from the ADCs 528) are sent through a WTA (winner takes it all) 522 circuitry to find the maximum index which provides the prediction.

The controller in encoder 530 generates in a time-wise defined way signals for n-gram-shift 532, n-gram_start 534, n-gram_end 536, query_end 538, and query_valid 540 to trigger the controller 526 of the AM 504.

Experiments have been conducted on the prototype PCM chip, wherein all components of both IM and AM data were stored on hardware PCM devices. In the full chip experiment, training was performed in software, and measurements for both, IM crossbars and AM crossbars at each step of the HD computing algorithm were taken from the PCM prototype chip for inference.

TABLE 1

| | Full CMOS | | | PCM crossbar based | | |
|---|---|---|---|---|---|---|
| | Encoder | AM search | Total | Encoder | AM search | Total |
| Energy | | | | | | |
| Average energy per query (nJ) | 1680 | 1110 | 2790 | 463 | 7.81 | 470.8 |
| Improvement | | | | 3.63x | 141.7x | 5.93x |
| Exclusive modules avg. energy per query (nJ) | 1260 | 1110 | 2370 | 40.2 | 3.30 | 43.5 |
| Improvement | | | | 31.3x | 335x | 54.43x |
| Area | | | | | | |
| Total area (mm²) | 4.79 | 2.43 | 7.22 | 1.36 | 0.075 | 1.43 |
| Improvement | | | | 3.52x | 32.54x | 5.05x |
| Exclusive modules area (mm²) | 3.55 | 2.18 | 5.73 | 0.11 | 0.074 | 0.18 |
| Improvement | | | | 32.3x | 29.5x | 31.1x |

Table 1 shows a comparison of an implementation as a full CMOS circuit and an implementation which is PCM crossbar based.

In order to benchmark the performance of the system in terms of energy consumption, the digital submodules in the system-level architecture (marked with dotted boundaries in FIG. 5, namely unit 516, 514, 530, 518, 526, 524, 520, 522 as well as the multiplexers at the output of the AM 504) that fall outside the PCM crossbars arrays were synthesized using 65 nm CMOS technology. The synthesis results of these modules can be combined with the performance characteristics of PCM crossbar arrays to arrive at figures of merit such as energy, area and throughput of the full system. Furthermore, PCM crossbar sections were implemented in CMOS distributed standard cell registers with associated multiplier adder tree logic and binding logic respectively for associative memory and item memory to construct a complete CMOS HD processor with the intention of comparing against the figures of merits of PCM-crossbar based architecture proposed in this document. A comparison of the performance between all-CMOS approach vs. the PCM crossbar based approach is presented in table 1. As seen in the table, a 5.93 times improvement in total energy efficiency and 5.05×reduction in area is obtained with the introduction of the PCM crossbar modules. The encoder's energy expense for processing a query reduces by a factor of 3.6 with the PCM crossbar implementation, whereas that of the AM search module reduces by a factor of 141.7. However, these efficiency factors are partially masked by the CMOS peripheral circuitry that is common to both implementations, specifically that in the encoder module which accounts for the majority of its energy consumption. When peripheral circuits are ignored and only the parts of the design that are exclusive to each approach are directly compared to each other, energy savings of a factor of 31 and 335 are obtained for the encoder and AM search module, respectively. It remains part of the future work to investigate methods in which peripheral modules are designed more energy efficiently so that the overall system efficiency can be improved further.

FIG. 6 shows an exemplary block diagram 600 of an in-memory hyper-dimensional computing architecture which may be implemented in CMOS technology.

The reference numerals are mostly corresponding to the one of FIG. 5. Namely, the index buffer 616, the controller 630—with its related signals n-gram shift 632, n-gram_start 634, n-gram_end 636, query_end 638, and query_valid 640—controller 626—with related signals partition select 642, class index 644 and AM address 646—item memory 603 of dimension h*d, bundler 618, associative memory (AM) 610 of dimension (c*f)*(d/f), the adder trees 620, and the WTA circuit 622.

It may be noted that the units above the bold horizontal line related to the encoder 602, whereas all units below the bold horizontal line related to the associative memory and the distance measurement units (604).

It may also be noted that the following vectors are present at the respective positions: the n-gram hyper-dimensional vector at position 650, the sum HD vector at position 652, and the query HD vector at position 654. Furthermore, reference numeral 656 may denote the sum buffer for the determination of the partial distances between the query vector and the profile vectors.

A register-transfer-level (RTL) SystemVerilog hardware implementation is taken as a baseline for an implementation of the CMOS HDC processing engine and modified to match the performance characteristics of the proposed in-memory HDC system. FIG. 7 shows the module hierarchy of the CMOS HDC processor architecture. In order to match the throughput of the proposed in-memory HDC system architecture, IM 603 is designed to have a word size equal to the dimensionality d=10,000 and the number of addresses equal to the size of the symbol set. In the final implementation, the IM 603 has allocated 27 addresses to match the size of the largest symbol set out of those that are used in the experimental datasets that are considered.

The AM 604 is designed to have a word size of the sub-vector length of partitioned prototype HD vectors d/f=1000 and total number of addresses is equal to the product of number of classes and number of partitions c×f. In the final implementation, the number of addresses in the AM 604 is set at 220, as the language dataset has the highest number of classes, which is 22, and a partition factor of 10 is chosen during experiments. The aspect ratios given above for the memories are ill-suited for realizing them by SRAM macros. Instead, the memories are mapped to distributed standard cell registers. To improve the area and energy efficiency, CMOS HD encoder only stores the original basis HD vectors in the IM 603, instead of both original and complementary IMs because binding can be simply performed using an array of 10,000 XNOR gates.

The inputs to the IM 603 are provided through an index buffer where n consecutive symbol indices are stored. During a generation of a single n-gram, index buffer cycles through and reads the existing symbol indices in the buffer while constructing the n-gram in the minterm buffer residing at the output of XNOR gate array. When an n-gram is produced in the buffer 614 at the end of n-th cycle, all symbol indices are right shifted by one position, and a new symbol index is admitted to the leftmost vacant slot in the index buffer.

Buffer 614 outputs are connected to an array of 10,000 6-bit signed accumulators inside the bundler 618. The binary n-gram HD vector elements are converted to bipolar values such that zeros and ones corresponding to the n-gram HD vector elements are mapped to −1 and 1, respectively, for accumulation prior to thresholding in order to ensure the 6-bit range is sufficient for symbol sequence of any length. At the end of the sequence, the accumulator outputs are saved into a query buffer 658 after applying a component wise threshold, which is equal to zero for bipolar values.

In the AM search module 604, a 1000-bit fraction of query HD vector is combined with the corresponding partition of a prototype HD vector drawn from the AM 604 via an array of AND gates 648 and the resulting 1,000 bits are fed into a binary adder tree 620. The 10-bit output of the adder tree 620 for all 1,000-bit fractions of the query HD vector are passed through a demultiplexer and accumulated separately based on the class label inside the sum buffer 656.

After iterating through all the partitions and class labels, a winner-takes-all (WTA) circuit 622 residing at the output of the sum buffer compares the accumulated values and outputs the index of the class with maximum accumulated value as the predicted index (or class).

For completeness reasons, FIG. 7 shows a flowchart of a method 700 relating to the here proposed concept for hyper-dimensional computing for inference tasks. The method 700 comprises storing, 702, hyper-dimensional item vectors in an item memory, forming, 704, a hyper-dimensional query vector from a query input and hyper-dimensional base vectors stored in the item memory, and determining, 706, a distance between the hyper-dimensional query vector and a plurality of hyper-dimensional profile vectors, such that in-memory computing using memristive devices is performed during the storing, forming and determining.

Last but not least, some more details should be given regarding the 2-minterm encoder:

In order to generate an n-gram HD vector in n cycles, the crossbar is operated using the following procedure. During the first cycle, n-gram encoding is initiated by asserting the 'start' signal while choosing the index of n-th symbol s[n]. This enables all the gate lines in both crossbar arrays and the wordline corresponding to s[n] to be activated. The current released onto the bitlines passed through the sense amplifiers should ideally match the logic levels of B[n] in first array and $\overline{B[n]}$ in the second array. The two 'minterm buffers' downstream of the sense amplifier arrays register the two HD vectors by the end of the first cycle. During subsequent j-th (1<j≤n) cycles, the gate lines are driven by the right shifted version of the incumbent values on the minterm buffers—effectively implementing permutation—while row decoders are fed with symbol s[n−j+1]; the left shift is used for the second crossbar. This ensures that the output currents on the bitlines correspond to the component-wise logical AND between the permuted minterm buffer values and the next basis HD vector B[n−j] (complement for the second array). The expression for the value stored on the left-side minterm buffers at the end of j-th cycle is given by $$\pi_{k=1}^{j} \rho^{j-k} B[n-k+1]$$

The product of the complementary HD vectors given by $$\pi_{k=1}^{j} \rho^{j-k} \overline{B[n-k+1]}$$

is stored in the right-side minterm buffers. At the end of the n-th cycle, the two minterms are available in the minterm buffers. The elements in the minterm buffers are passed onto the OR gate array following the minterm buffers (shown in FIG. 3), such that inputs to the array have matching indices from the two minterm vectors. At this point, the output of the OR gate array reflects the desired n-gram HD vector from 2-minterm n-gram encoding.

After n-gram encoding, the generated n-grams are accumulated and binarized. In the hardware implementation, this step is realized inside the bundler module shown in FIG. 4. The threshold applied to binarize the sum HD vector elements is given by:

$$l \cdot \left( \frac{1}{2^{n-\log(k)}} \right)$$

where l is the length of the sequence, n is the n-gram size, and k is the number of minterms used for the binding operation in the encoder.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept may be summarized by the following clauses:

1. A device for hyper-dimensional computing for inference tasks, the device comprising
    an item memory for storing hyper-dimensional item vectors,
    query transformation unit connected to the item memory, the query transformation unit being adapted for forming a hyper-dimensional query vector from a query input and hyper-dimensional base vectors stored in the item memory, and
    an associative memory adapted for storing a plurality of hyper-dimensional profile vectors and adapted for determining a distance between the hyper-dimensional query vector and the plurality of stored hyper-dimensional profile vectors, wherein the item memory and the associative memory are adapted for in-memory computing using memristive devices.

2. The device according to clause 1, wherein the in-memory computing is adapted to perform operations for inference tasks without altering the state of the memristive devices.

3. The device according to clause 1 or 2, wherein the memristive devices are selected out of the group comprising, phase-change memory devices, ionic thin-film memristive devices, spin-based memristive devices, and magnetic memristive devices.

4. The device according to any of the preceding clauses, wherein the item memory comprises a crossbar array of memristive devices having as many memristive storage elements per row as the hyper-dimensional item vector has dimensions d.

5. The device according to any of the preceding clauses, wherein the associative memory comprises a crossbar array of memristive devices, and each profile hyper-dimensional vector is partitioned into equally sized (size p) profile sub-hyper-dimensional vectors, such that each profile sub-hyper-dimensional vector is encodable as binary conductance states into the memristive devices of one of a plurality of rows comprised in the associative memory.

6. The device according to clause 5, also comprising
a measurement unit adapted for measuring sub-hyper-dimensional vector currents resulting from applying query sub-hyper-dimensional vectors to corresponding profile sub-hyper-dimensional vectors, wherein the query sub-hyper-dimensional vectors are partitions of an equally partitioned (size p) query hyper-dimensional vector, and
an adder unit adapted for adding the respective sub-hyper-dimensional vector currents resulting in the distance between the query hyper-dimensional vector and the profile hyper-dimensional vector.

7. The device according to any of the preceding clauses, wherein the item memory and the query transformation unit are portions of an encoder unit, and where during training the hyper-dimensional profile vector per class to be predicted is determinable by binding shifted versions of selected item memory vectors to generate binary n-gram hyper-dimensional vectors, whereby intermediate results of the binding operation are storable in minterm buffers, by bundling together the n-gram hyper-dimensional vectors in a sum hyper-dimensional vector by summing the respective n-gram hyper-dimensional vector elements, and by applying a threshold on the elements of the sum hyper-dimensional vector to determine binary hyper-dimensional profile vector elements.

8. The device according to any of the preceding clauses, wherein the item memory comprises two symmetrical crossbar arrays, one being adapted for storing the hyper-dimensional item vector and the other one being adapted for storing a complement of the hyper-dimensional item vector.

9. The device according to any of the preceding clauses, wherein an output unit of the associative memory comprises a plurality of multiplexers, a summing buffer and a winner-takes-it-all (WTA) unit for a determination of a result of the query as a class output of an inference task.

10. The device according to any of the preceding clauses, wherein the distance between the hyper-dimensional query vector and a plurality of hyper-dimensional profile vectors in the associative memory is determined by the Hamming distance or by the dot-product between the respective vectors.

11. The device according to any of the preceding clauses, wherein the query transformation unit comprises for each dimension of the hyper-dimensional vectors a minterm buffer, a sum hyper-dimensional vector buffer, and a threshold unit.

12. The device according to any of the preceding clauses, wherein a controller, as a portion of the encoder, is adapted for issuing control signals orchestrating a data movement from a query symbol sequence to a query hyper-dimensional vector at the output of the encoder according to a configuration pertaining to a query symbol sequence received via a configuration interface.

13. The device according to any of the preceding clauses, wherein a second controller as a portion of an associative memory search module is adapted for iterating through each partition of the query sub-hyper-dimensional vector and activating corresponding partitions in the associative memory to obtain partial distances.

14. A method for hyper-dimensional computing for inference tasks, the method comprising
storing hyper-dimensional item vectors in an item memory,
forming a hyper-dimensional query vector from a query input and hyper-dimensional base vectors stored in the item memory, and
determining a distance between the hyper-dimensional query vector and a plurality of hyper-dimensional profile vectors,
such that in-memory computing using memristive devices is performed during the storing, forming and determining.

15. The method according to clause 14, wherein the memristive devices are selected out of the group comprising, phase-change memory devices, ionic thin-film memristive devices, spin-based memristive devices, and magnetic memristive devices.

16. The method according to clause 14 or 15, wherein the item memory comprises a crossbar array of memristive devices having as many memristive storage elements per row as the hyper-dimensional item vector has dimensions d.

17. The method according to any of the clauses 14 to 16, also comprising
partitioning an associative memory comprising a crossbar array of memristive devices, and
partitioning each profile hyper-dimensional vector into equally sized (size p) profile sub-hyper-dimensional vectors, and
encoding each profile sub-hyper-dimensional vector as binary conductance states into the memristive devices of one of a plurality of rows comprised in the associative memory.

18. The method according to clause 17, also comprising
measuring sub-hyper-dimensional vector currents resulting from applying query sub-hyper-dimensional vectors to corresponding profile sub-hyper-dimensional vectors, wherein the query sub-hyper-dimensional vectors are partitions of an equally partitioned (size p) query hyper-dimensional vector, and
adding the respective sub-hyper-dimensional vector currents resulting in the distance between the query hyper-dimensional vector and the profile hyper-dimensional vector.

19. The method according to any of the clauses 14 to 18, also comprising determining during training the hyper-dimensional profile vector per class to be predicted by binding shifted versions of selected item memory vectors to generate binary n-gram hyper-dimensional vectors, whereby intermediate results of the binding operation are stored in minterm buffers, by bundling together the n-gram hyper-dimensional vectors in a sum hyper-dimensional vector by summing the respective n-gram hyper-dimensional vector elements, and by applying a threshold on the elements of the sum hyper-dimensional vector to determine binary hyper-dimensional profile vector elements.

20. The method according to any of the clauses 14 to 19, wherein the item memory comprises two symmetrical crossbar arrays, one being adapted for storing the hyper-dimensional item vector and the other one being adapted for storing a complement of the hyper-dimensional item vector.

21. The method according to any of the clauses 14 to 20, wherein an output unit of the associative memory comprises a plurality of multiplexers, a summing buffer and a winner-takes-it-all (WTA) unit for a determination of a result of the query as a class output of an inference task.

22. The method according to any of the clauses 14 to 21, also comprising
determining the distance between the hyper-dimensional query vector and a plurality of hyper-dimensional profile vectors in the associative memory by the Hamming distance or by the dot-product between the respective vectors.

23. The method according to any of the clauses 14 to 22, wherein the determining a hyper-dimensional query vector comprises for each dimension of the hyper-dimensional vectors a usage of a minterm buffer, a sum hyper-dimensional vector buffer, and a threshold unit in a query transformation unit.

24. The method according to any of the clauses 14 to 23, also comprising
issuing control signals orchestrating a data movement from a query symbol sequence to a query hyper-dimensional vector after the encoding according to a configuration pertaining to a query symbol sequence received via a configuration interface.

25. The method according to any of the clauses 14 to 24, wherein a second controller, as a portion of an associative memory search module, is adapted for iterating through each partition of the query sub-hyper-dimensional vector and activating corresponding partitions in the associative memory to obtain partial distances.

What is claimed is:

1. A device for hyper-dimensional computing for inference tasks, the device comprising
an item memory for storing hyper-dimensional item vectors,
query transformation unit connected to the item memory, the query transformation unit being adapted for forming a hyper-dimensional query vector from a query input and hyper-dimensional base vectors stored in the item memory, and
an associative memory adapted for storing a plurality of hyper-dimensional profile vectors and adapted for determining a distance between the hyper-dimensional query vector and the plurality of stored hyper-dimensional profile vectors,
wherein the item memory and the associative memory are adapted for in-memory computing using memristive devices.

2. The device according to claim 1, wherein the in-memory computing is adapted to perform operations for inference tasks without altering the state of the memristive devices.

3. The device according to claim 1, wherein the memristive devices are selected out of the group comprising, phase-change memory devices, ionic thin-film memristive devices, spin-based memristive devices, and magnetic memristive devices.

4. The device according to claim 1, wherein the item memory comprises a crossbar array of memristive devices having as many memristive storage elements per row as the hyper-dimensional item vector has dimensions d.

5. The device according to claim 1, wherein the associative memory comprises a crossbar array of memristive devices, and each profile hyper-dimensional vector is partitioned into equally sized (size p) profile sub-hyper-dimensional vectors, such that each profile sub-hyper-dimensional vector is encodable as binary conductance states into the memristive devices of one of a plurality of rows comprised in the associative memory.

6. The device according to claim 5, also comprising:
a measurement unit adapted for measuring sub-hyper-dimensional vector currents resulting from applying query sub-hyper-dimensional vectors to corresponding profile sub-hyper-dimensional vectors, wherein the query sub-hyper-dimensional vectors are partitions of an equally partitioned (size p) query hyper-dimensional vector, and
an adder unit adapted for adding the respective sub-hyper-dimensional vector currents resulting in the distance between the query hyper-dimensional vector and the profile hyper-dimensional vector.

7. The device according to claim 1:
wherein the item memory and the query transformation unit are portions of an encoder unit, and
where during training the hyper-dimensional profile vector per class to be predicted is determinable by binding shifted versions of selected item memory vectors to generate binary n-gram hyper-dimensional vectors, whereby intermediate results of the binding operation are storable in minterm buffers, by bundling together the n-gram hyper-dimensional vectors in a sum hyper-dimensional vector by summing the respective n-gram hyper-dimensional vector elements, and by applying a threshold on the elements of the sum hyper-dimensional vector to determine binary hyper-dimensional profile vector elements.

8. The device according to claim 1, wherein the item memory comprises two symmetrical crossbar arrays, one being adapted for storing the hyper-dimensional item vector and the other one being adapted for storing a complement of the hyper-dimensional item vector.

9. The device according to claim 1, wherein an output unit of the associative memory comprises a plurality of multiplexers, a summing buffer and a winner-takes-it-all (WTA) unit for a determination of a result of the query as a class output of an inference task.

10. The device according to claim 1, wherein the distance between the hyper-dimensional query vector and a plurality of hyper-dimensional profile vectors in the associative memory is determined by the Hamming distance or by the dot-product between the respective vectors.

11. The device according to claim 1, wherein the query transformation unit comprises for each dimension of the hyper-dimensional vectors a minterm buffer, a sum hyper-dimensional vector buffer, and a threshold unit.

12. The device according to claim 1, wherein a controller, as a portion of the encoder, is adapted for issuing control signals orchestrating a data movement from a query symbol sequence to a query hyper-dimensional vector at the output of the encoder according to a configuration pertaining to a query symbol sequence received via a configuration interface.

13. The device according to claim 1, wherein a second controller as a portion of an associative memory search module is adapted for iterating through each partition of the query sub-hyper-dimensional vector and activating corresponding partitions in the associative memory to obtain partial distances.

14. A method for hyper-dimensional computing for inference tasks, the method comprising:
storing hyper-dimensional item vectors in an item memory,
forming a hyper-dimensional query vector from a query input and hyper-dimensional base vectors stored in the item memory, and
determining a distance between the hyper-dimensional query vector and a plurality of hyper-dimensional profile vectors,
such that in-memory computing using memristive devices is performed during the storing, forming and determining.

15. The method according to claim 14, wherein the memristive devices are selected out of the group comprising, phase-change memory devices, ionic thin-film memristive devices, spin-based memristive devices, and magnetic memristive devices.

16. The method according to claim 14, wherein the item memory comprises a crossbar array of memristive devices having as many memristive storage elements per row as the hyper-dimensional item vector has dimensions d.

17. The method according to claim 14, also comprising:
partitioning an associative memory comprising a crossbar array of memristive devices, and
partitioning each profile hyper-dimensional vector into equally sized (size p) profile sub-hyper-dimensional vectors, and
encoding each profile sub-hyper-dimensional vector as binary conductance states into the memristive devices of one of a plurality of rows comprised in the associative memory.

18. The method according to claim 17, also comprising:
measuring sub-hyper-dimensional vector currents resulting from applying query sub-hyper-dimensional vectors to corresponding profile sub-hyper-dimensional vectors, wherein the query sub-hyper-dimensional vectors are partitions of an equally partitioned (size p) query hyper-dimensional vector, and
adding the respective sub-hyper-dimensional vector currents resulting in the distance between the query hyper-dimensional vector and the profile hyper-dimensional vector.

19. The method according to claim 14, also comprising:
determining during training the hyper-dimensional profile vector per class to be predicted by binding shifted versions of selected item memory vectors to generate binary n-gram hyper-dimensional vectors, whereby intermediate results of the binding operation are stored in minterm buffers, by bundling together the n-gram hyper-dimensional vectors in a sum hyper-dimensional vector by summing the respective n-gram hyper-dimensional vector elements, and by applying a threshold on the elements of the sum hyper-dimensional vector to determine binary hyper-dimensional profile vector elements.

20. The method according to claim 14, wherein the item memory comprises two symmetrical crossbar arrays, one being adapted for storing the hyper-dimensional item vector and the other one being adapted for storing a complement of the hyper-dimensional item vector.

21. The method according to claim 14, wherein an output unit of the associative memory comprises a plurality of multiplexers, a summing buffer and a winner-takes-it-all (WTA) unit for a determination of a result of the query as a class output of an inference task.

22. The method according to claim 14, also comprising:
determining the distance between the hyper-dimensional query vector and a plurality of hyper-dimensional profile vectors in the associative memory by the Hamming distance or by the dot-product between the respective vectors.

23. The method according to claim 14, wherein the determining a hyper-dimensional query vector comprises for each dimension of the hyper-dimensional vectors a usage of a minterm buffer, a sum hyper-dimensional vector buffer, and a threshold unit in a query transformation unit.

24. The method according to claim 14, also comprising:
issuing control signals orchestrating a data movement from a query symbol sequence to a query hyper-dimensional vector after the encoding according to a configuration pertaining to a query symbol sequence received via a configuration interface.

25. The method according to claim 14, wherein a second controller, as a portion of an associative memory search module, is adapted for iterating through each partition of the query sub-hyper-dimensional vector and activating corresponding partitions in the associative memory to obtain partial distances.

* * * * *